Dec. 7, 1965  W. F. ISLEY  3,221,718

PISTON CONSTRUCTION

Filed Jan. 9, 1964

INVENTOR.
WALTER F. ISLEY
BY

ATTORNEYS 3,221,718
PISTON CONSTRUCTION
Walter F. Isley, Grosse Pointe, Mich., assignor to Continental Aviation and Engineering Corporation, Detroit, Mich., a corporation of Virginia
Filed Jan. 9, 1964, Ser. No. 336,681
13 Claims. (Cl. 123—32)

The present invention relates to internal combustion engines, particularly to such engines in which the combustion chamber is arranged entirely or substantially entirely within the head portion of the piston and more particularly to a new piston assembly for such engines.

The advantages of providing the combustion chamber within the head portion of the piston have been known for some time. It has also been proven that the most desirable shape for such a combustion chamber is in the form of a nearly hemispherical hollow space or cavity.

There are, however, certain inherent disadvantages in providing such a piston construction which have not heretofore been satisfactorily overcome. Since the most desirable shape for the combustion chamber is in the form of a cavity slightly larger than a hemisphere, a thin lip of material is left at the entrance to the combustion chamber cavity. With the use of ordinary metals for the piston, this lip or edge has the tendency to crack or break off under the extremely high temperatures produced in the combustion chamber during operation of the engine. To construct the piston entirely of a high temperature material such as stainless steel is too expensive.

Secondly, because the combustion chamber cavity extends well into the head portion of the piston, the heat produced in the cavity during operation of the engine is readily transmitted to the piston ring groove area of the piston. High temperatures in this area produce fuel deposits in the ring grooves and tend to shorten the life of the piston rings.

It is an object then of the present invention to reduce thermal cracking of the lip portions of pistons having the combustion chamber positioned in the head portion thereof by providing a top member for such pistons constructed of a high temperature material having the combustion chamber located therein.

It is another object of the present invention to cool the ring groove area of a piston having the combustion chamber therein by providing a piston assembly for such an engine comprising a hollow piston member and a top member secured to the piston member and a cooling cavity formed between the top member and the piston member.

Still further objects and advantages of the present invention will readily occur to one skilled in the art to which the invention pertains upon reference to the following drawings in which like reference characters refer to like parts throughout the several views and in which—

*Description*

Figure 2:
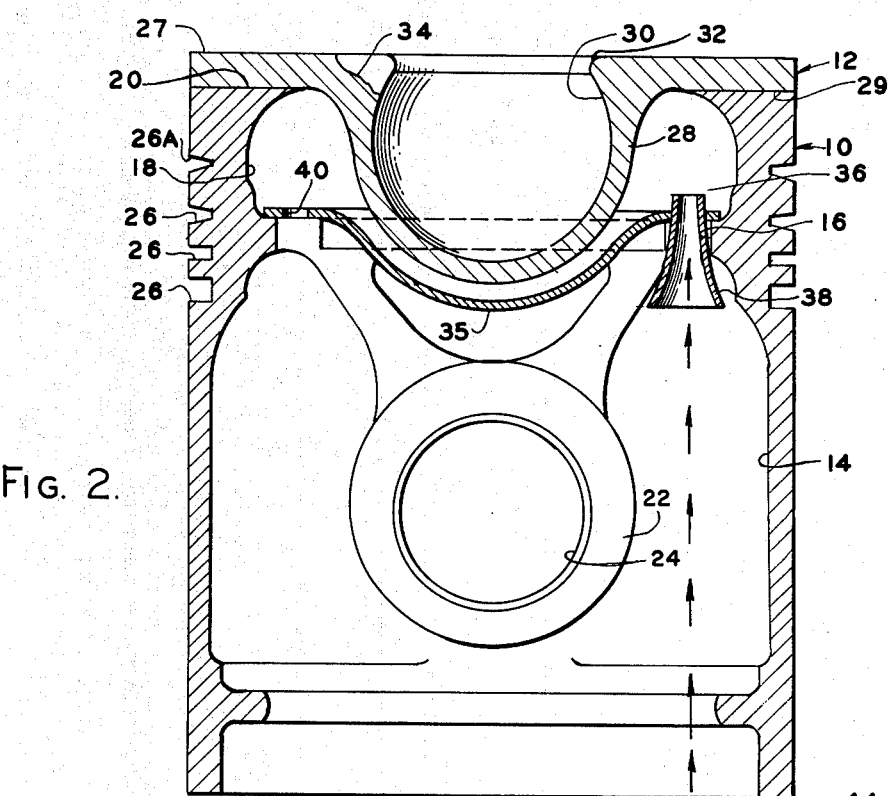
FIG. 2 is a cross sectional view taken substantially on line 2—2 of FIG. 1.
Figure 1:
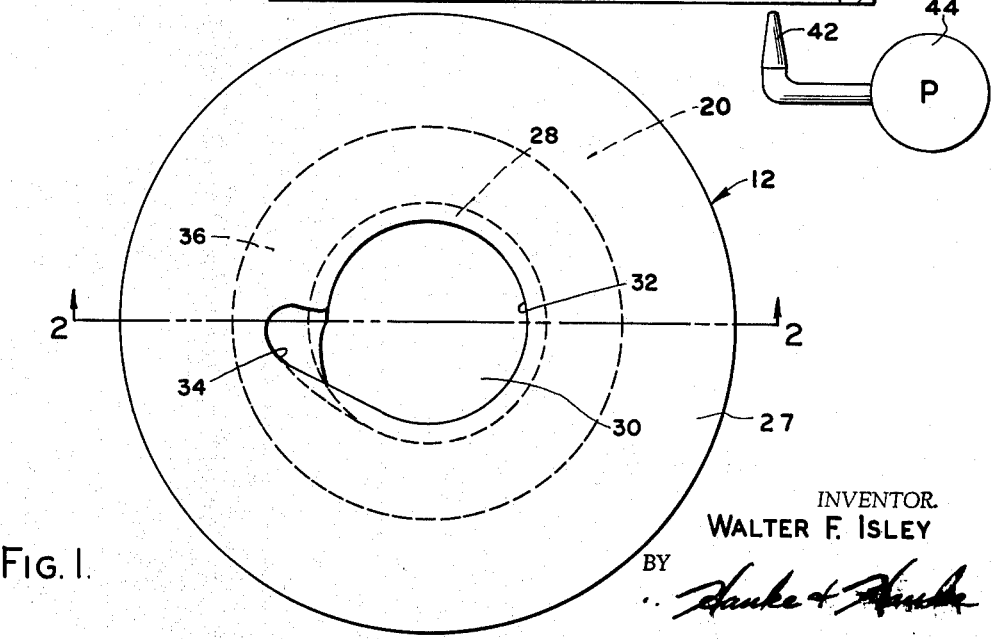
FIG. 1 is a top elevational plan view of a piston of the present invention.

Now referring to the drawings for a more detailed description of the present invention a preferred piston assembly is illustrated as comprising a piston member 10 and a top member 12 secured to the upper face of the piston member 10 in any convenient manner such as welding.

The piston member 10 is hollow as shown to provide an axially extending substantially cylindrical interior recess 14. A radially extending rib portion 16 extends into the recess 14. The interior wall of the piston 10 is arcuately formed above the rib 16 as shown at 18 to provide a radially extending annular top surface 20 of sufficient width to support the top member 12.

Wrist pin bosses 22 extend radially into the recess 14 below the rib portion 16 and from opposite sides of the piston 10. The bosses 22 are each provided with an axially aligned opening 24 and are adapted to carry a conventional wrist pin (not shown).

A plurality of axially spaced piston ring grooves 26 and a top ring groove 26A are provided on the exterior surface of the piston member 10 and each is adapted to carry a piston ring (not shown).

The top member 12 is preferably constructed of a high temperature material such as stainless steel or the like and comprises a top planar surface 27 positioned above and substantially parallel with the top surface 20 of the piston member 10 and a central portion 28 defining a substantially spherical combustion chamber cavity 30 extending into the recess 14. A lower planar surface 29 is adapted to be secured to the top surface 20 as by welding or brazing.

The combustion chamber cavity 30 is in the form of a major portion of a sphere and therefore a circular, relatively thin lip 32 defines the entrance to the combustion chamber cavity 30 and a groove 34 is provided in the upper face of the top member 12 to direct fuel from an injection nozzle (not shown) into the combustion chamber cavity 30.

The central portion 28 is radially inwardly spaced from the interior wall of the piston member 10 as shown and a baffle member 35 is welded or brazed to the interior wall of the piston member 10 to provide a cavity 36 encompassing the combustion chamber cavity 30 and positioned between the cavity 30 and the area of the piston ring grooves 26 and 26A. A cone shape inlet tube 38 is provided in the baffle member 35 and extends upwardly into the cavity 36. The baffle member 35 is also provided with an outlet opening 40. A nozzle 42 is positioned to direct oil through the inlet tube 33 into the cavity 36. The nozzle 42 is adapted for connection to the engine oil pump 44.

The construction of the present invention provides a piston assembly constructed of a high temperature material such as stainless steel or the like in those areas where thermal cracking is likely to occur. In ordinary piston constructions, the thin lip or edge 32 has the tendency to crack under the high temperatures produced in the combustion chamber. By providing the top member 12 of a high temperature material this will not occur.

The cavity 36 provides an effective thermal dam between the combustion chamber cavity 30 and the area of the piston ring grooves 26. The cavity 36 extends at least below the plane of the top ring groove 26A as shown since this is the groove which collects fuel deposits when high temperatures exist in this area. The resulting reduction in temperatures in this area tends to increase the life of the piston rings and reduces deposits in the ring grooves which are produced when temperatures exceed the coking temperature of the fuel being used to operate the engine.

The particular combination of the present invention makes it possible to form the cooling cavity 36 without producing a difficult casting problem. Without the provision of separate members making up the piston of the present invention, it would be necessary to provide a die cast which would produce this cavity. The position and desired configuration of the cavity makes it impossible to use a solid core for forming the cavity and thus it would be necessary to provide a complicated and expensive split core for this purpose.

During operation of the engine, oil is pumped through the nozzle 42 into the conical shaped inlet tube 38 and into the cavity 36. The reciprocating movement of the piston 10 during engine operation produces movement of the oil in the cavity 36. Because the opening of the inlet tube 38 is high in the cavity 36 and above the outlet opening 40, the oil will flow around the cavity 36 and will exhaust to the crankcase (not shown) of the engine through the outlet opening 40. In this way the temperatures in the vicinity of the lip 32 and the ring grooves 26 are substantially reduced to reduce thermal cracking of the lip 32 and to reduce distortion of the piston rings and deposits in the ring grooves 26.

It is apparent that the present invention provides a piston having high temperature materials in those areas where such materials are desirable. The two piece construction herein disclosed, however, permits the use of less expensive materials in those areas where it is not necessary to use relatively expensive high temperature materials such as stainless steel or the like.

It is also apparent that although I have described a single embodiment of the present invention, many changes and modifications can be made without departing from the spirit of the invention as expressed by the appended claims.

I claim:

1. In an internal combustion engine a piston assembly comprising,
    (a) a piston member having an upper planar surface having a central opening and a substantially cylindrical recess provided in said piston member in registry with said opening and defined by an inner substantially annular surface,
    (b) a top member extending entirely across said upper planar surface and having a lower surface secured to said upper surface,
    (c) said top member having a central portion defining a combustion chamber cavity and extending through said opening and into said recess,
    (d) said combustion chamber cavity being in the form of the major portion of a sphere,
    (e) said piston member being provided with means closing the lower end of said recess, and
    (f) said means being spaced from said central portion of said top member.

2. The piston assembly as defined in claim 1 and in which said top member is constructed of stainless steel.

3. The piston assembly as defined in claim 1 and in which said central portion of said top member is spaced from said annular surface of said piston member to define a cavity substantially encompassing said combustion chamber cavity.

4. The piston assembly as defined in claim 3 and including means circulating a cooling fluid through said last mentioned cavity.

5. The piston assembly as defined in claim 1 and in which a thin circular lip defines the entrance to said combustion chamber cavity and said top member is constructed of a high temperature material whereby thermal cracking of said lip is reduced.

6. The combination as defined in claim 1 and in which said last mentioned means comprises a baffle member secured to said piston member.

7. In an internal combustion engine a piston assembly comprising,
    (a) a piston member having an upper planar surface having a central opening and a substantially cylindrical recess provided in said piston member in registry with said opening and defined by an inner substantially annular surface,
    (b) said piston member having an outer annular surface and a plurality of axially spaced grooves being provided on said outer surface substantially concentric with said recess and each of said grooves being adapted to receive a piston ring,
    (c) a top member extending entirely across said upper planar surface and having a lower surface secured to said upper surface,
    (d) said top member having a central portion defining a combustion chamber cavity and extending through said opening and into said recess,
    (e) said combustion chamber cavity being in the form of the major portion of a sphere and said top member being provided with a circular lip defining the entrance of said combustion chamber cavity,
    (f) said combustion chamber cavity extending into said recess below the planes of at least some of said grooves,
    (g) said piston member being provided with means extending across said recess to close the lower end thereof, and
    (h) said central portion of said top member being spaced from said inner annular surface of said piston member and said last mentioned means to define a cavity encompassing said combustion chamber cavity and positioned intermediate said combustion chamber cavity and said grooves.

8. The assembly as defined in claim 7 and in which said top member is secured to said piston member by welding.

9. The assembly as defined in claim 7 in which said top member is constructed of a high temperature material such as stainless steel whereby thermal cracking of said lip is reduced.

10. The piston assembly as defined in claim 7 and including means circulating a cooling fluid through said last mentioned cavity.

11. The piston assembly as defined in claim 7 and in which said last mentioned means comprises a baffle member secured to said piston member.

12. In an internal combustion engine a piston assembly comprising,
    (a) a piston member being hollow to define an interior wall and having an upper planar surface,
    (b) a top member having a portion extending across said upper planar surface and having a lower surface secured to said upper surface,
    (c) said top member having a central portion defining a substantially spherical combustion chamber cavity and extending into the interior of said piston member,
    (d) said central portion being spaced from said interior wall of said piston member, and
    (e) a baffle member carried by said interior wall of said piston member and closing the interior of said piston member at a point inwardly spaced from said central portion whereby a cavity is formed encompassing said combustion chamber cavity.

13. The piston assembly as defined in claim 12 and including means circulating a cooling fluid through said last mentioned cavity.

References Cited by the Examiner

UNITED STATES PATENTS

| 1,627,719 | 5/1927 | Willis | 92—224 |
| 1,675,618 | 7/1928 | Short | 92—224 |
| 2,880,044 | 3/1959 | Coffey | 92—213 |
| 3,112,738 | 12/1963 | Morris | 123—32.2 |

FOREIGN PATENTS

| 634,700 | 2/1928 | France. |
| 750,635 | 8/1933 | France. |

MARK NEWMAN, *Primary Examiner.*

RICHARD B. WILKINSON, *Examiner.*